United States Patent
Goetz

(10) Patent No.: US 7,283,990 B2
(45) Date of Patent: Oct. 16, 2007

(54) METHOD AND SYSTEM FOR MANAGING RESOURCES FOR MULTI-SERVICE JOBS BASED ON LOCATION

(75) Inventor: Frank M. Goetz, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 459 days.

(21) Appl. No.: 10/899,813

(22) Filed: Jul. 27, 2004

(65) Prior Publication Data

US 2006/0026008 A1 Feb. 2, 2006

(51) Int. Cl.
*G06F 17/30* (2006.01)

(52) U.S. Cl. ............ 707/2; 707/3; 707/10; 707/204; 707/205

(58) Field of Classification Search ........... 707/2–3, 707/10; 705/26–27
See application file for complete search history.

(56) References Cited

U.S. PATENT DOCUMENTS

| | | | |
|---|---|---|---|
| 5,642,303 A | | 6/1997 | Small et al. |
| 5,761,653 A | * | 6/1998 | Schiefer et al. ............ 707/2 |
| 5,991,739 A | * | 11/1999 | Cupps et al. ............ 705/26 |
| 6,067,542 A | * | 5/2000 | Carino, Jr. ............ 707/4 |
| 6,493,104 B1 | | 12/2002 | Cromer et al. |
| 6,591,297 B1 | | 7/2003 | Challener et al. |
| 6,651,142 B1 | * | 11/2003 | Gorelik et al. ............ 711/119 |
| 6,732,195 B1 | | 5/2004 | Baldwin |
| 6,865,567 B1 | * | 3/2005 | Oommen et al. ............ 707/2 |
| 2002/0055878 A1 | * | 5/2002 | Burton et al. ............ 705/26 |
| 2003/0084025 A1 | * | 5/2003 | Zuzarte ............ 707/2 |
| 2003/0123902 A1 | | 7/2003 | Wagner et al. |
| 2004/0010488 A1 | * | 1/2004 | Chaudhuri et al. ............ 707/3 |
| 2004/0077359 A1 | * | 4/2004 | Bernas et al. ............ 455/456.1 |
| 2004/0133446 A1 | * | 7/2004 | Myrick et al. ............ 705/1 |
| 2005/0050041 A1 | * | 3/2005 | Galindo-Legaria et al. .... 707/4 |

* cited by examiner

*Primary Examiner*—Cam Y T Truong
(74) *Attorney, Agent, or Firm*—Maginot, Moore & Beck

(57) ABSTRACT

A system and method generate and select an optimal job plan in response to a user's job request. The system may be implemented with an orchestrator that includes a user interface, a job plan generation manager, a job plan selector, and a job plan manager. The user interface communicates with a requesting user to receive a job request, user location and preference data, and provide a user with job plan status data. The job plan generator generates the permutations of job plans for implementing the requested job. The job plan selector computes the job plan scores for each of the generated job plans and selects the one that corresponds to the best score for some criterion. Data regarding the selected job plan may be provided to the user interface for communication to the user. The job plan manager supervises the service sites in accordance with the selected job plan and provides status information to the user interface for communication to the user.

12 Claims, 4 Drawing Sheets

| PLAN 1 (P1) | | | PLAN 2 (P2) | | |
|---|---|---|---|---|---|
| SERVICE | DISTANCE (FROM USER) | WEIGHTED DISTANCE (FROM USER) | SERVICE | DISTANCE (FROM USER) | WEIGHTED DISTANCE (FROM USER) |
| S1 | 1 | 1 | S1 | 1 | 1 |
| S2 | 1 | 2 | S2 | 3 | 6 |
| S3 | 3 | 9 | S3 | 1 | 3 |
| TOTAL | 5 | 12 | TOTAL | 5 | 10 |

METHOD AND SYSTEM FOR MANAGING RESOURCES FOR MULTI-SERVICE JOBS BASED ON LOCATION

FIELD OF THE INVENTION

The present invention relates generally to job management systems in a computer network, and more particularly, to systems for managing jobs that require multiple services available through a computer network.

BACKGROUND OF THE INVENTION

Computer communication networks enable multiple computers to communicate with one another to facilitate the exchange of information and to increase productivity. Such networks make a variety of computer services available to a user including databases, email, voicemail, scanners, and fax machines. Typically, a user is coupled to a network through a computer that is either a work station or a laptop. Increasingly, users are accessing computer communication networks through personal digital assistants (PDAs) and cellular telephones. These devices and laptop computers facilitate user mobility; however, they sometimes frustrate a user's ability to use a network efficiently.

One example of mobility impacting a user's effective use of service sites on a network occurs when a user travels from one local area network (LAN) to another LAN that the user may use. This type of mobility occurs when a user who may be typically stationed at a firm's home office travels to a branch location. Though the user may bring a PDA or laptop computer for coupling to the LAN at the branch, the user does not know what services sites are available through the branch network. Although authorized to access the branch LAN, the user does not know what service sites are coupled to the branch LAN, such as a scanner or shared printer, for example. Furthermore, the user does not know where any of the network service sites are located. Thus, even if the user is able to identify a service site and send a job to it, the user may not be able to find the service site to retrieve the finished product.

LANs may also be coupled together with a wide area network (WAN). In the scenario discussed above, the home office LAN and the branch LAN may be coupled together through a wide area network (WAN). The WAN may be the Internet or an enterprise operated WAN. Thus, a user coupled to the branch LAN may be able to access service sites coupled to the home office LAN through the WAN to obtain documents and other communications at the user's location on the branch LAN. Should the user need the information obtained from the home office LAN to be printed or formatted at the branch LAN for physical distribution at the branch office, the document needs to be routed to a service site, such as a printer, on the branch LAN. Only with the help of a branch LAN user who knows the locations of the available printers and the identifiers by which the printers are distinguished can the visiting user send the print job to the printer physically closest to the user's current location.

The visiting user's ability to employ effectively the resources on the branch LAN may be further frustrated by the lack of information regarding the capabilities of the resources on the branch LAN. For example, the visiting user may desire to print the documents in a color format, but may be unable to determine which of the printers, if any of them, on the branch LAN are color printers. The inability of mobile users to know where service devices are physically located for obtaining product from the devices and the lack of readily available knowledge regarding the capabilities of service devices on an unfamiliar network adversely impact effective utilization of a network.

In an effort to make some information regarding the identification of service sites available to users, directory entries may be available on the network or information may be posted in hard copy form at an access point for the network. However, such static information may quickly become dated and no longer accurately identify locations, capabilities, or the types of devices available at service sites. The topology and implementation of computer networks are fluid, both expanding and shrinking to accommodate new equipment and users as they are added and subtracted from the network.

SUMMARY OF THE INVENTION

The present invention addresses the need for assisting users in the exploitation of a network's resources by providing a method for selecting an optimal plan for implementing a user's job request for network services. The method includes receiving a job request and user location data, generating a plurality of plans to implement the job request, and selecting a generated job plan that best comports with the user location data. This method does not require the user to select the site services for performing a job nor does the user need to know his or her location and the relative locations of the services required to implement the job.

The method may also include managing performance of the job in accordance with the selected job plan. Status information regarding the performance of the job plan may be generated and provided to the user as job status data. The user location data may also include user preference data so that the method of the present invention delivers a product of the completed job to a location other than the one from which the user sent the job request.

The selection of a generated job plan includes weighting a distance value assigned to each service in a generated job plan and computing a job plan score for each generated job plan. The selected job plan has the best job plan score according to some criterion. In one embodiment of the present invention, the criterion is the shortest distance to the user and the distance value of the last service site is most heavily weighted in the computation of the job plan score.

The generation of job plans includes obtaining capability and location data for the services available on a computer network. The capability and location data may be obtained from a directory service or from locally stored system service configuration data. A directory service may be the system service that publishes all the system service configuration data. Alternatively, the method may include the communication of configuration data from the service sites so that the data may be locally stored or cached. Thereafter, the locally stored configuration data may be accessed for job plan generation. Periodically, the locally stored configuration data may be updated or it may be updated as part of any removal or installation of a service site device.

The method of the present invention may be performed with an orchestrator program that may execute on a network controller or server coupled to a computer network. The orchestrator may be comprised of system components and include a user interface, a job plan generator, a job plan selector, and a job plan manager. These components may be modules or data objects of an orchestrator program that are implemented in known computer programming languages.

The user interface communicates with a requesting user to receive a job request, user location and preference data, and provide a user with job plan status data. The job plan generator generates the permutations of job plans for implementing the requested job. The job plan selector computes the job plan scores for each of the generated job plans and selects the one that corresponds to the best score for some criterion. Data regarding the selected job plan may be provided to the user interface for communication to the user. The job plan manager supervises the service sites in accordance with the selected job plan and provides status information to the user interface for communication to the user.

The above described features and advantages, as well as others, will become more readily apparent to those of ordinary skill in the art by reference to the following detailed description and accompanying drawings.

DETAILED DESCRIPTION

Figure 1:
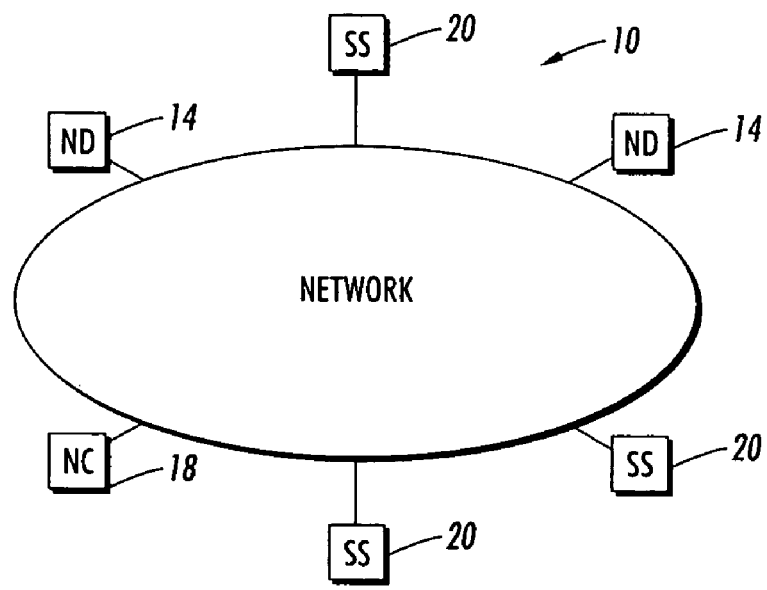
FIG. 1 shows a block diagram of a network in which the system and method of the present invention may be implemented.

FIG. 1 shows an example of a network 10 in which the principles of the present invention may be implemented. Network 10 includes network devices 14 and a network controller 18. The network devices 14 may be user devices that access the network 10 for communication with other user devices or to request jobs requiring multiple services to be completed from network controller 18. Such devices include personal computers, document scanners, personal digital assistants (PDAs), and the like. A document imaging device, such as a scanner, may also be coupled to the network 10 through a network device 14. Service sites 20 are also coupled to the network 10. Service sites 20 provide data or document services to network devices. Service sites 20 include email servers, voicemail servers, document reproductions systems, fax machines, and the like. The network devices 14, service sites 20, and the network controller 18 communicate in a peer-to-peer relationship.

Figure 2:
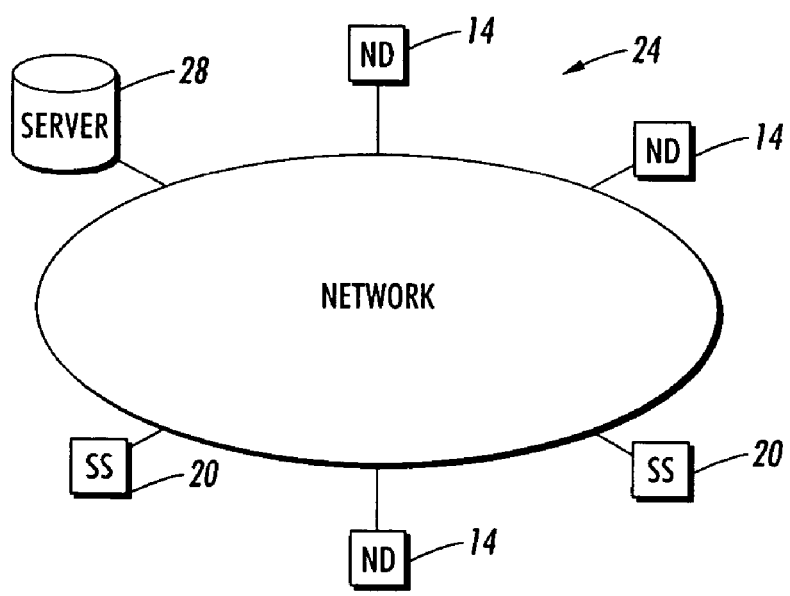
FIG. 2 shows a block diagram of another system in which the system and method of the present invention may be implemented.

Using like numerals to identify like components, another example of a network 24 in which the principles of the present invention may be implemented is shown in FIG. 2. The network 24 includes network devices 14, a server 28, and service sites 20. The server 28 performs the functions of the network controller 18 as well as those functions typically performed by a server in a server/client network. The network devices 14 and the service sites 20 communicate with the server 28 in a server/client relationship. The server 20 may also be coupled to a common gateway interface for access to other networks and devices.

Figure 3:
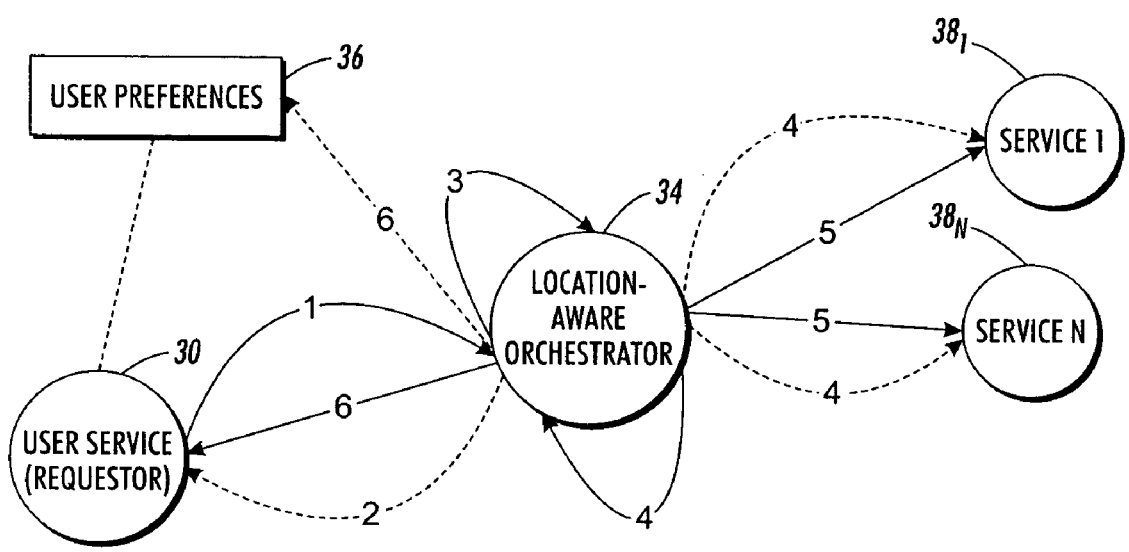
FIG. 3 is a data flow diagram of a system for selecting an optimal plan for implementing a user job request and performing the selected plan.

A depiction of the data flow that may be used to implement a system and method of the present invention is shown in FIG. 3. In the figure, data are communicated between a user requesting service 30 and a location-aware orchestrator 34. The user requesting service 30 may be a user application program on a user network device 14. The location-aware orchestrator 34 is a supervisory program that executes on the network controller 18 or the server 28. User preferences 36 are data regarding a user and possible locations. For example, the user preference data may include a reference to a user email address at a particular office so that the orchestrator 34 can determine that a completed job should be sent by email to the address regardless of where the user was located when the job request was submitted. Another type of user preference may reference a calendar program so that the orchestrator 34 may determine where the user will be located when a job is completed and route the finished product accordingly. These preference data may be stored on the device executing the user service requesting program or another enterprise wide data server. The services $38_1$ to $38_N$ are programs that execute on a device at a service site 20 to perform all or part of a service supported by the service site.

According to FIG. 3, the user submits a job request to the location-aware orchestrator 34 (path 1). The orchestrator 34 determines the user's physical location (path 2). The location data may be obtained through an electronic device, such as a GPS locator that is part of the network device 14, or a manual interactive method, such as a data object sent to the network device 14 and executed by the user requesting application. The current user location data may also be supplemented by user preference data, if the user wants the finished product delivered somewhere other than the user's current location. The orchestrator 34 determines potential plans for implementing the requested job with the capabilities available at the service sites 20 (path 3). The orchestrator 34 selects an optimal plan based on the location of the user (path 4). The method for determining which plan is optimal with respect to location is presented more fully below. The orchestrator 34 manages the execution of the selected plan by distributing the appropriate service requests at the correct times (path 5). The orchestrator 34 communicates the status of the job to the user based on the user's location and, possibly, the user preferences (path 6).

Figure 4:
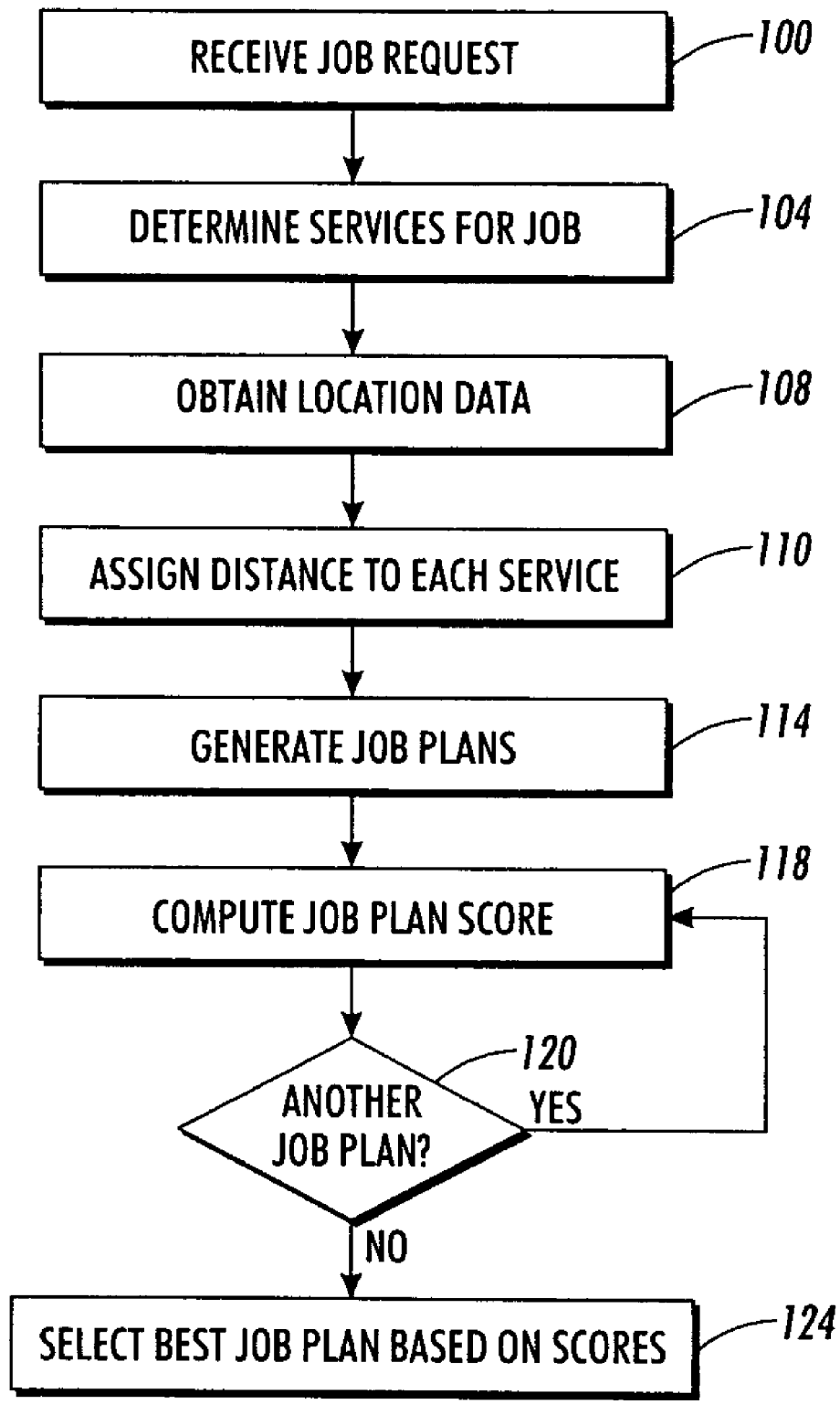
FIG. 4 is a flow diagram of a method for selecting an optimal plan for implementing a user job request and performing the selected plan

As shown in FIG. 4, the orchestrator 34 receives a job request (block 100) and determines the services required for implementing a job request (block 104). The orchestrator 34 obtains user location data and preference data, if any (block 108). Based upon the user current address or an indicated preference for delivery of the finished product, a distance is assigned to a service (block 110). The orchestrator 34 generates a plurality of job plans, each one comprised of a set of services sites for support services that are required to implement the requested job (block 114). A job score is computed for a job plan (block 118) and the process determines whether job scores need to be computed for other job plans (block 120). Preferably, the distance value for each service in a job plan is weighted and the services used for finishing a job plan are more heavily weighted so those that are more closely located to the delivery site for the finished job are favored. The job plan corresponding to the best job plan score is selected for performing the requested job (block 124).

Figures 5, 6:
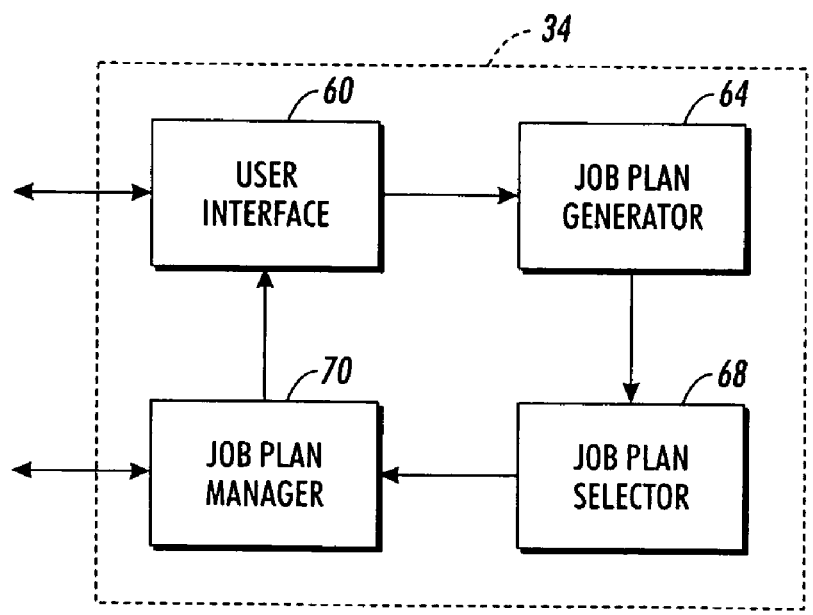
FIG. 5 is a table comparing two job plans and the job plan scores for each job plan computed in accordance with a weighting scheme.
FIG. 6 is a block diagram of an orchestrator that may be used to implement the principles of the present invention.

For example, the table shown in FIG. 5 depicts two plans, each of which consists of three services to implement a requested job. Although the total distance score for the two plans is the same, the weighted score favors the second plan, P2. The weighting scheme depicted in FIG. 5 favors the plan having the last service for implementing the requested job at the shortest distance from the user's requesting location. This type of weighting scheme may be preferred for jobs that produce physical output, such as a printed document, and the user wants to travel the shortest distance to obtain the output. Another weighting scheme may favor an output device having a higher throughput so that less time is required for printing the document. Of course, other weighting schemes may be developed without departing from the principles of the present invention.

The orchestrator 34 may be comprised of system components, such as shown in FIG. 6. There, orchestrator 34 includes a user interface 60, a job plan generator 64, a job plan selector 68, and a job plan manager 70. These components may be modules or data objects of an orchestrator program that are implemented in known computer programming languages. The user interface 60 communicates with a requesting user to receive a job request, user location and preference data, and provide a user with job plan status data. The job plan generator 64 generates the permutations of job plans for implementing the requested job. The job plan selector 68 computes the job plan scores for each of the generated job plans and selects the one that corresponds to the best score for some criterion. Data regarding the selected job plan may be provided to the user interface 60 for communication to the user. The job plan manager supervises the service sites in accordance with the selected job plan and provides status information to the user interface 60 for communication to the user.

The orchestrator 34 may obtain data regarding the services available for performing jobs from either a directory service or by locally associating a store of such information with the orchestrator. For example, the directory service may be the system service that publishes all the system service configuration data. Orchestrator 34 may communicate with the directory service to obtain relevant data regarding service capabilities. Another method is to have the services provide their configuration data to the orchestrator so that the data may be locally stored or cached. The orchestrator may then access local memory to ascertain the available services, their capabilities, and their locations.

While the present invention has been illustrated by the description of exemplary processes and system components, and while the various processes and components have been described in considerable detail, applicant does not intend to restrict or in any way limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for assisting users in an exploitation of service sites on a computer network by selecting a job plan for implementing a user's job request for services accessible through the computer network includes:

generating a job request that includes user location data executing on a network device coupled to the computer network;

sending the job request to an orchestrator supervisory program executing on a computer coupled to the computer network, the orchestrator supervisory program managing service sites on the computer network to perform the job request;

generating with the orchestrator supervisory program a plurality of job plans to implement the job request, each job plan in the plurality of job plans identifying the service sites accessible through the computer network for implementing the job request;

assigning a distance to each service of a service site identified in the job plan, the distance being assigned by the orchestrator supervisory program with reference to the user location data received with the job request;

computing with the orchestrator supervisory program a job score for each job plan in the plurality of job plans, each job score being computed with reference to the distance assigned for each service in each job plan, wherein each said job plan in the plurality of job plans has services, each said service having the assigned distance;

ranking the job plans in the plurality of job plans with reference to the computed job scores;

selecting a job plan in the ranked job plans corresponding with a best ranked job score for responding to a user;

managing with the orchestrator supervisory program the service sites identified in the selected job plan to implement the job request in accordance with the selected job plan;

generating with the orchestrator supervisory program status information regarding implementation of the job request with the selected job plan by the service sites identified in the selected job plan; and providing the generated status information as job status data from the orchestrator supervisory program to a network device that communicated the job request being implemented.

2. The method of claim 1 wherein the assignment of a distance to a service further comprises:

communicating with the network device that generated the job request to obtain user preference data that identifies location data for a job request other than a user's location; and assigning a distance to a service in a job plan with reference to the location data identified by the preference data.

3. The method of claim 1 wherein the job plan generation includes:

receiving system service configuration data from a directory service; and identifying a service site in accordance with the system service configuration data.

4. The method of claim 1 wherein the job plan generation includes:

obtaining with the orchestrator supervisory program configuration data from the service sites accessible through the computer network;

storing the configuration data obtained from the service sites in local memory accessible by the orchestrator supervisory program; and accessing the local memory for configuration data to identify service sites for implementing a job request.

5. The method of claim 4 the job score computation includes:

weighting the distance assigned to each service in a generated job plan; and computing a job plan score for each generated job plan with reference to the weighted distance.

6. The method of claim 5, the job plan ranking being performed with reference to the shortest distance assigned to a service site for finishing the job plan that is identified in the selected job plan.

7. A system for assisting users in an exploitation of service sites on a computer network by selecting a job plan for implementing a user's job request for services accessible through the computer network comprising:
- an orchestrator supervisory program that executes on a computer as a server communicating on the computer network, the orchestrator supervisory program further comprising:
- a user interface for communicating with a network device to receive a job request having user location data over the computer network;
- a job plan generator for generating a plurality of job plans for implementing the job request received from the network device, each generated job plan identifying at least one service site in the service sites that provide a service to implement the job request, and for assigning each service in a job plan a distance with reference to the user location data in the job request;
- a job plan selector for computing a job plan score for each generated job plan in the generated plurality of job plans, the job plan score being computed with reference to the distance assigned each service accessible through the service sites identified in a job plan, for ranking the generated job plans in the plurality of job plans with reference to the computed job scores; and for selecting a job plan from the ranked job plans, the selected job plan having a best score that corresponds to a criterion for responding to a user, wherein each said job plan in the plurality of the ranked job plans has services, each service having the assigned distance; and
- a job plan manager for managing with the orchestrator supervisory program the service sites identified in the selected job plan to implement the job request in accordance with the selected job plan, for generating with the orchestrator supervisory program status information regarding the implementation of the job request with the selected job plan by the service sites identified in the selected job plan, and for providing the generated status information as job status data from the orchestrator supervisory program to the network device that communicated the job request being implemented.

8. The system of claim 7, the computer on which the orchestrator supervisory program executes being a network controller coupled to the computer network.

9. The system of claim 7, the computer on which the orchestrator supervisory program executes being a server coupled to the computer network.

10. The system of claim 7, the user interface communicating with the network device to receive user preference data.

11. The system of claim 7, the user interface communicating the selected job plan to the network device that generated the job request for the job plan being implemented.

12. A system for assisting users in an exploitation of service sites on a computer network by selecting a job plan for implementing a user's job request for services accessible through the computer network comprising:
- at least one network device coupled to the computer network;
- a plurality of service sites coupled to the computer network, each service site providing a service for implementing the job plan;
- an orchestrator supervisory program that executes on a computer communicating on the computer network, the orchestrator supervisory program further comprising:
- a user interface for communicating with the at least one network device to receive a job request having user location data;
- a job plan generator for generating a plurality of job plans for implementing the job request received from the network device, each generated job plan identifying at least one service site of the service sites that provide a service to implement the job request, for obtaining user location data from the job request, and for assigning each service in a job plan a distance with reference to the user location data in the job request;
- a job plan selector for computing a job plan score for each generated job plan in the generated plurality of job plans, the job plan score being computed with reference to the distance assigned each service accessible through the service sites identified in a job plan, for ranking the generated job plans in the plurality of job plans with reference to the computed job scores, and for selecting a job plan from the ranked job plans, the selected job plan having a best score that corresponds to a criterion for responding to a user, wherein each said job plan in the plurality of job plans has services and each said service has the distance assigned to the service; and
- a job plan manager for managing with the orchestrator supervisory program the service sites identified in the selected job plan to implement the job request in accordance with the selected job plan, for generating with the orchestrator supervisory program status information regarding the implementation of the job request with the selected job plan by the service sites identified in the selected job plan, and for providing the status information generated by the orchestrator supervisory program to the network device that communicated the job request being implemented, wherein the user interface, the job plan generator, the job plan selector, and the job plan manager are one of modules and data objects of the orchestrator supervisory program.

* * * * *